Patented Oct. 4, 1938

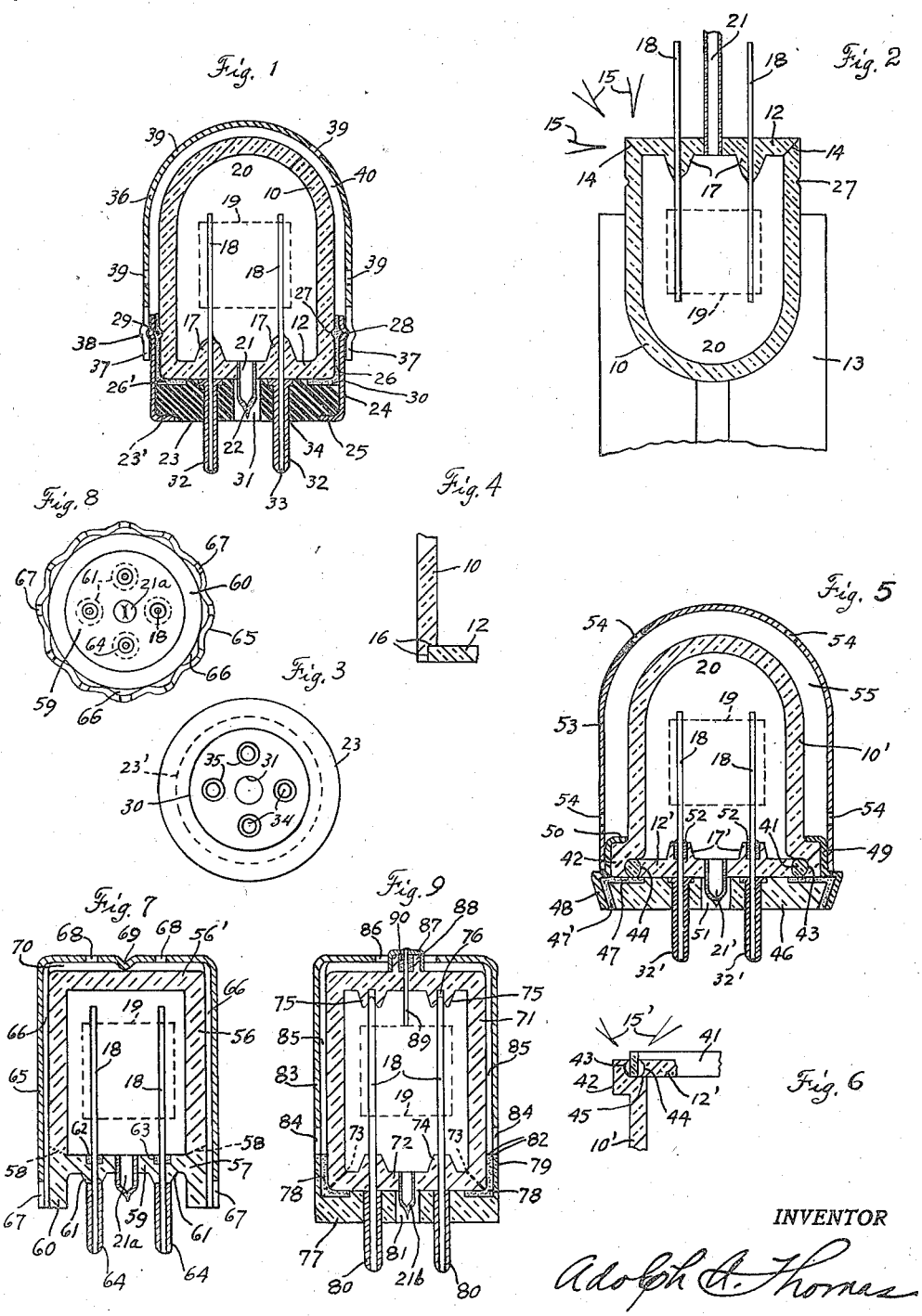

2,131,923

UNITED STATES PATENT OFFICE 2,131,923

ELECTRON TUBE

Adolph A. Thomas, New York, N. Y., assignor to Radio Corporation of America, New York, N. Y., a corporation of Delaware Application July 27, 1936, Serial No. 92,702

2 Claims. (Cl. 250—27.5)

My invention relates to electronic devices and its object is to provide a tube of novel construction which is characterized by mechanical strength, electrical efficiency and cheapness of manufacture. This new tube is particularly adapted for radio receivers, although the invention is not limited to that field.

Briefly stated, the main feature of my new electron tube comprises an envelope made of a low expansion glass of the type represented by Pyrex glass, which has high thermal endurance, can be made thick enough to withstand severe handling, and does not give off gas to vitiate the vacuum. Further, this tube consists of but few parts, which are cheap to make and easy to assemble.

The original radio tubes had an all-glass envelope blown of the conventional type of glass previously used in making electric light bulbs. The blown glass walls of such tubes were necessarily very thin and the mechanical strength of the tubes was correspondingly low. Also, those early radio tubes followed the bulging shape of the incandescent bulbs and were rather bulky, taking up considerable room in radio cabinets.

A short time ago there came the all-metal radio tubes, smaller and stronger than the old glass tubes, but more expensive to make and having the objection that the metal envelope gradually gave off gas which reduced the efficiency of the tube.

It is the purpose of this invention to produce an all-glass electron tube having the small size and mechanical strength of the all-metal tubes without the disadvantages of the latter. To that end I make the envelope of my tube entirely of a low expansion glass, such as the socalled Pyrex glass, which has an expansion coefficient less than 0.000004 and can safely be made of such thickness that it will not crack even under rough or careless handling. The glass envelope of my tube consists of two parts, a cylindrical body or shell and a base disk, which are formed separately and fused together into an integral glass enclosure for the electrodes. On account of the low expansivity of the glass used in this tube, the walls of the glass envelope can be made thick enough to give it (for practical purposes) the strength of an all-metal tube, but without the latter's disadvantage of giving off gas during the operation.

Another advantage of my glass tube over the prior metal tubes lies in the lower cost of manufacture. In the metal tubes each lead-in wire must be separately insulated from the metal base disk by means of a small thin sleeve of glass fused to an alloy eyelet, and these glass sleeves represent the extent of the insulation between the electrodes and the metal body of the tube. Then, too, in those metal tubes the welding of the shell and base is an operation requiring the most careful handling to insure a complete vacuum-tight contact. On the other hand, in my glass tube the lead-in wires are automatically insulated by the glass disk through which they pass in a sealed joint, and the vacuum-tight weld of fused glass between the cylinder and the base disk is easily and perfectly made by the use of gas jets.

The various novel features and practical advantages of my invention will be understood from a description of the accompanying drawing, in which Fig. 1 is a vertical section of a tube embodying my invention;

Fig. 2 illustrates the assembly of the glass parts for fusion;

Fig. 3 is a plan of the insulating base member that carries the contact pins of the tube shown in Fig. 1;

Fig. 4 is a fragmentary sectional view of a different form of joint between the two glass parts of the envelope;

Fig. 5 shows a modification in vertical cross-section;

Fig. 6 is a fragmentary view illustrating the method of welding together the glass cylinder and disk of the tube in Fig. 5;

Figs. 7 and 8 show another modification, Fig. 7 being a vertical cross-section and Fig. 8 a bottom plan; and Fig. 9 represents a vertical section of still another form of tube embodying my invention.

Referring to Fig. 1, the envelope or container of the tube consists of a cylindrical body 10 and a base disk 12, both parts being made of a low expansion glass similar to Pyrex glass and sufficiently thick to stand severe handling. The glass members 10 and 12 are pressed or molded separately and are fused together along their contact area. Fig. 2 shows a simple way of doing that; The cylinder 10 is held upside down on a rotary support 13, and the disk 12 is placed on the cylinder, the two parts contacting along their circular bevelled rims 14, which form a contact area of considerable width. During the sealing operation the support 13 is rotated and gas jets 15, properly arranged, gradually fuse the glass along the contact area 14, so that the two parts 10 and 12 become united by a strong weld to form an integral glass envelope, as indicated in Fig. 1.

The contact edges of the glass parts 10 and 12 need not be bevelled as shown at 14 in Fig. 2, for they may have any other practical contour. For example, in Fig. 4 the cylinder 10 is formed at its rim with a recess 16 of rectangular cross-section into which extends the edge of disk 12, whereby the latter is supported on the inverted cylinder during the sealing operation, as explained for Fig. 2. When the members 10 and 12 are welded together, the wall of recess 16 disappears and an integral glass envelope is produced, like that shown in Fig. 1.

The molded glass disk 12 may be formed with integral bosses 17 through which the lead-in wires or rods 18 pass and to which the latter are sealed along an axial contact of considerable extent. In this way the lead-in wires 18 are firmly embedded in disk 12 in a strong vacuum-tight weld and rigidly supported thereby. The bosses 17 may also be separate mounds of fused glass formed during the sealing of wires 18 to disk 12. The conducting wires or rods 18 are preferably of a metal or alloy having substantially the same coefficient of expansion as the glass of disk 12. The stiff wires 18 carry a suitable electrode assembly indicated diagrammatically by the dotted outline 19. As my invention is not concerned with any particular construction or arrangement of electrodes, I have not deemed it necessary to show or describe any specific electrode assembly. It is enough to say that the electrode assembly 19 may be of any practical construction, depending on the intended function of the tube. For example, in a radio tube, the electrodes 19 would comprise a cathode, an anode, and one or more control grids, as will be understood by those familiar with that art.

It goes without saying that the lead-in wires 18 and electrode assembly 19 are mounted on disk 12 before the latter is sealed to cylinder 10. The exhausting of the glass-walled chamber 20 is done through a small glass tube 21 which is sealed into a central hole in disk 12 and which is connected with a suitable vacuum pump. When the desired degree of vacuum has been attained, the tube 21 is sealed off, as shown at 22 in Fig. 1.

A base disk 23, molded of suitable insulating material (such as porcelain or a condensation product), is attached to the glass envelope 10—12 in any practical way. In Fig. 1 there is a sheet metal collar 24 with an inturned bottom flange 25 which fits into an annular recess 23' in the bottom of disk 23. The cylindrical collar 24 is sufficiently long to extend part-way up the glass cylinder 10 and is slightly spaced therefrom to provide an annular recess filled with cementitious material 26. The cylinder 10 may have a circular groove 27 and the collar 24 may have a hollow bead 28 opposite groove 27 to form an enlarged circular space 29 packed with a ring of cement which locks the collar 24 to the glass body 10. The base disk 23 may have a shallow circular recess 30 on top adapted to be filled with a flat ring of cement 26' which is really a continuation of the cement shell 26. The disk 23 may fit so tightly into collar 24 that it need not be separately cemented thereto, although it may be if desired. A central hole or recess 31 in disk 23 receives and protects the sealed tip 22 of the glass exhaust tube 21.

The insulating base disk 23 carries electric contact pins 32, the number and arrangement of which depend upon the structure of the electrode assembly 19. For the sake of this description I have assumed a tube with four contact pins circularly arranged in axial alignment with the lead-in wires 18. The metal pins 32 are preferably hollow to receive the leads 18 in a close fit, and a drop of solder 33 at the tip insures good electrical contact between the parts. The insulating disk 23 has holes 34 for the pins 32, and the heads of these pins fit into recesses 35 at the inner ends of the holes, so that the heads of the pins are flush with the inner top face of disk 23 and lie against the underside of the glass disk 12. The contact pins 32 are preferably cemented or otherwise secured to disk 23, which is sufficiently thick to form a rigid support for the projecting pins. Any other practical means or method may be used for properly mounting the pins 32 in disk 23. The inturned flange 25 of the metal collar 24 is preferably flush with the underside of disk 23 so that the tube as a whole may be firmly mounted on the flat top of a socket or other support.

If the tube above described is of a type that requires electric and magnetic shielding, I provide the tube with a sheet metal can or cylinder 36 mounted on collar 24. To facilitate mounting of shield 36, its open end may be axially slotted, as indicated at 37, to provide spring blades which are formed with a hollow circular bead 38 adapted to snap over the bead 28 on collar 24. In this way the metal shield or can 36 is firmly yet removably mounted on the base portion of the completed tube. If desired, the shield 36 may be soldered or otherwise secured to collar 24 as a permanent structural part of the device in commercial form. The shield preferably has air holes 3 at the top and bottom for the circulation of cooling air through the space 40.

In the modification of Fig. 5, the glass cylinder 10' and glass disk 12' are sealed together by an interposed glass ring 41. Although this ring appears in Fig. 5 for clearness as a separate member, it fuses during the sealing operation into the glass of members 10' and 12', so that these three parts form an envelope with an integral glass wall. Fig. 6 illustrates how the sealing ring 41 is fused in place. The cylinder 10' is formed with a flange 42 which has a circular recess or groove 43 curved in cross-section or otherwise widened at the center. The rim of disk 12' has a reversely shaped circular groove 44 opposite groove 43, so that a ring-shaped space is left between the two grooves. The cylinder 10' is suitably supported upside down and the disk 12' is placed over it, the rim of the disk resting on the inner shoulder 45 of the cylinder. The glass ring 41 is then placed in the space between the opposite grooves 43—44, and heat is applied by means of gas jets 15' or otherwise. The area of sealing ring 41 is such that in fusing it fills the space between grooves 43—44 and becomes an integral mass with the glass members 10' and 12'. That is to say, in Fig. 5 as in Fig. 1, the glass parts 10'—12' are fused together into an integral vacuum-tight wall enclosing the tube chamber 20. Ordinarily, the separate sealing ring 41 will not be necessary, but in some special cases the use of such a ring may be desirable or convenient, as in tubes of certain shape or size, or where the glass of members 10'—12' is of such hardness that the use of a softer glass ring would be advisable to effect the sealing. The glass of members 10'—12' is of the type represented by Pyrex glass and has an expansion coefficient less than 0.000004. The sealing ring 41 may be of the same glass as members 10'—12'; if not, it should have substantially the same expansion coefficient.

Still referring to Fig. 5, a base disk 46 of suitable insulating material (such as porcelain or a condensation product) is secured to the bottom of the glass unit 10'—12' by cement 47, and a sheet metal collar 48 is attached to disk 46 by cement 47'. The two cement layers 47—47' may be portions of the same cementitious mass. The inwardly bevelled rims of disk 46 and collar 48 lock these parts against relative axial displacement independently of the adhesive action of the cement wall 47—47'. The sheet metal collar 48 has an upper section 49 fitting snugly around the flange 42 of cylinder 10', and the inturned rim 50 of the collar overlies said flange so as to lock the collar against axial displacement. The lower opening of collar 48 is slightly larger than the outer diameter of flange 42, so that the collar can be readily inserted over the cylinder 10'. Likewise, the disk 46 is so proportioned as to be insertable into the collar 48, and the disk has a central hole 51 for housing and protecting the sealed tip of exhaust tube 21' carried by disk 12'.

What has been said about the mounting of pins 32 in disk 23 of Fig. 1 applies to the contact pins 32' carried by disk 46 in Fig. 5. The lead-in wires 18 in Fig. 5 are sealed to disk 12' by means of small glass rings or collars 52 held in the recessed bosses 17' of the disk. These separate sealing collars 52 are not absolutely necessary but may be found convenient in certain cases, as previously explained for the sealing ring 41. So it will be understood that the lead-in wires 18 in Fig. 5 may be sealed directly to the bosses 17', as shown in Fig. 1, and the sealing rings 52 may be used for the wires 18 in Fig. 1. Also, what was said about the electrode assembly 19 in Fig. 1 goes for the electrode assembly 19 in Fig. 5.

The glass tube of Fig. 5 may have a metal shield 53 mounted thereon, either separably or permanently, this shield being supported directly on collar 48 by engaging the cylindrical section 49 thereof in a tight frictional fit. If the shield 53 is not intended for removal, it may be soldered or otherwise secured to collar 48. Air holes 54 in shield 53 permit circulation of cooling air through the space 55 surrounding the glass bulb or cylinder 10'. The sheet metal cans 36 and 53 are preferably of magnetic material to absorb not only electrical but also magnetic disturbances, and they may be grounded through the metal collars 24 and 48 when the tube is mounted for operation.

In Fig. 7 the glass envelope of the tube consists of a flat-topped cylinder 56 fused to a base member 57 along the annular contact area indicated by the dotted lines 58. The cross-section of this contact area is preferably bevelled to facilitate the centering of part 56 on part 57 during the sealing operation, but these two parts may be welded together along a contact line of different cross-sectional contour and differently located than contact 58. The glass base 57 is pressed or molded in one piece consisting of a disk 59 and an annular flange 60 on which the tube rests when mounted in operative position. The bottom surface of disk 59 has integral bosses 61 through which pass the lead-in wires 18 that carry the electrode assembly 19, as explained for Fig. 1. The wires 18 may be sealed directly to the glass disk 59 or separate glass rings 62 may be used, which, when fused, fill the recesses 63 in the top of disk 59 and completely surround the rods or wires 18 in a permanent vacuum-tight seal. Metal sleeves 64 are soldered to the projecting portions of wires 18 and constitute the contact pins of the tube. The sleeves 64 may abut at their upper ends against the bosses 61 and may be cemented thereto. The glass exhaust tube 21a projecting from disk 59 terminates short of the rim of flange 60 and is protected thereby. The parts 56—57, like the parts 10—12 and 10'—12' previously described, are pressed or molded of a low expansion glass such as Pyrex glass, and are sufficiently thick to stand severe handling.

The glass envelope 56—57 of Fig. 7 may carry a shield 65 of corrugated sheet metal firmly held in place by the inherent spring pressure contact of the vertical corrugations, as clear from Fig. 8. These corrugations also form air passages 66 along and around the cylindrical surface of envelope 56—57, and air holes 67 and 68 at the bottom and top of the shield provide for the circulation of cooling air around the tube. The flat top of shield 65 may have integral button or lug 69 adapted to engage the flat top 56' of cylinder 56 and thus leave an air space 70 with which the vertical air passages 66 communicate. In this way a continuous stream of cooling air circulates all around and across the top of the tube. The electromagnetic shield 65 also acts as a mechanical protector for the glass envelope 56—57, although the latter is strong enough by itself to withstand not only ordinary but even rough and careless handling. Since the tube of Fig. 7 has no separate base member like the tubes of Figs. 1 and 5, it presents a more simple and compact structure.

In Fig. 9 the glass envelope is formed by a cylinder 71 and a disk 72 sealed together along the annular contact area indicated by the dotted lines 73, this contact area being similar to that indicated by 14 in Fig. 2, which may also be considered as illustrating a convenient method of fusing the glass members 71—72 together. These members are made of a low expansion glass, as previously explained for members 10—12 of Fig. 1. The disk 72 carries the lead-in wires 18 which support the electrode assembly 19, and the disk may have bosses 74 through which the wires pass and to which they are sealed, whereby the axial sealing and supporting contact between the glass disk and the conducting wires is increased. However, the bosses 74 may be omitted because the upper ends of the lead-in wires 18 engage bosses 75 projecting downwardly from the flat top of cylinder 71. The bosses 75 have each a recess 76 into which the inner ends of wires 18 extend in a snug fit to prevent side movement of the wires and the electrodes carried thereby. A little free space is preferably left in the recesses 76 to allow for expansion of wires 18, and the recesses may be widened at the mouth to guide the ends of the wires into them when the disk 72 is placed over the cylinder 71 for sealing. By supporting the lead-in wires at both ends, the electrode assembly 19 is held steady under all conditions, and this feature is of particular advantage in long tubes.

Still referring to Fig. 9, a base member 77 molded of suitable insulating material is secured to the bottom of the glass envelope 71—72, as by cement 78. The base 77 has an integral upper flange 79 which surrounds the lower portion of cylinder 71 and is slightly spaced therefrom to make room for the interposed wall of cement. The insulating base 77 carries metal sleeves 80 into which the wires 18 extend and which constitute the contact pins of the tube. A hole or recess 81 in base 77 accommodates the exhaust tube 21b, which is thereby fully protected. The cement wall 78 and surrounding flange 79 form an annular shoulder 82 on which rests a metal shield 83, preferably of corrugated sheet metal (like the shield 65 of Figs. 7-8) and having air holes 84 at the bottom, vertical air passages 85 formed by the axial corrugations, and a hole 86 at the top to permit access to the terminal cap 87. The top hole 86 is also an outlet for the flow of cooling air through the corrugated shield 83, which fits snugly over the cylinder 71 by means of its inherent resiliency, as explained for shield 65 in Figs. 7-8. The metal cap 87 is firmly mounted on a boss or nipple 88 formed integral with the flat top of cylinder 71, and the cap may be soldered or cemented in place. A wire 89 connects the cap 87 with an element (such as an extra control grid, for example) of the electrode assembly 19, as will be understood without further explanation. The wire 89 passes through the glass nipple 88 and is sealed thereto either directly or by means of a small glass sleeve 90. The outer end of wire 89 is soldered to cap 87, which is insulated from all the other contacts of the tube by virtue of its glass mounting. The hole 86 in the metal shield 83 keeps the latter spaced from the metal cap 87.

Having described several representative embodiments of my invention, I will now say something more about the practical advantages resulting from the use of a low expansion glass for the envelope of the tube. For convenience I shall refer to the main cylindrical body of the envelope by the numeral 10 and to the base disk by numeral 12, as given in Fig. 1, but I include the glass envelopes formed by the parts 10'—12' in Fig. 5, the parts 56—57 in Fig. 7, and the parts 71—72 in Fig. 9, since all of these are made of the same type of low expansion glass.

As already mentioned, the glass comprising the envelope of my new tube is a low expansion glass of the boro-silicate type represented by the so-called Pyrex glass of commerce, with a linear coefficient of expansion less than 0.000004, and preferably in the neighborhood of 0.0000033. For practical purposes, then, this glass is not affected by changes of temperature, so that the walls of envelope 10—12 can be made of considerable thickness without danger of cracking from the heat inside and the cooling air (or other fluid) on the outside surface of the envelope. For ordinary radio tubes the walls of the glass envelope would be about $\frac{3}{32}$ of an inch thick, which provides ample mechanical strength to stand pretty rough handling and sudden shocks. For larger tubes, such as high-power tubes, the thickness of the glass envelope may be somewhat greater, say of the order of ⅛ of an inch. I mention these figures merely by way of illustration and not as limitation of my invention. The point I wish to emphasize here is that the low expansion coefficient of the glass of envelope 10—12 permits the walls to be made of such thickness that my all-glass tube has practically the same high degree of mechanical strength as the all-metal radio tubes and yet is free of the disadvantages inherent in the metal tubes, as previously explained. Further, the low expansion glass envelope of my new tube is particularly serviceable in the large water-cooled power tubes employed in transmission apparatus. Such an envelope, aside from making the tube stronger, will safely withstand variable temperature differences in its glass wall due to the heating of the inner surface and the cooling of the outer surface, even if these temperature variations are sudden and extreme.

The two parts 10—12 of the glass envelope are readily formed in a mold by pressing, so that any desired shape and thickness can be imparted to them. In some cases it may be more convenient or preferable to form the main body of the envelope by blowing the glass in a mold of the required shape. The hardness of the boro-silicate glass used is preferably between 800 and 900 degrees centigrade, so that it is easily maintained in plastic condition for the molding or blowing operation. Also, this low degree of hardness of the glass makes it easy to fuse the parts of the envelope together. The separate sealing ring 41 in Fig. 5 may be used when the glass of members 10'—12' has a high degree of hardness, the sealing ring in that case being of softer glass to facilitate the welding operation. The lead-in wires 18 should have practically the same expansion coefficient as the glass seal that welds them to the disk through which they pass. An alloy of iron and nickel known in the trade as Invar would be suitable for the wires or rods 18, because the expansion coefficient of that alloy is practically negligible.

The electrical advantages residing in the glass envelope 10—12 are, first, that the lead-in rods or wires 18 are automatically insulated by the glass disk 12, and second, that the smooth dense surface of the glass gives off no gas during the operation of the tube. These advantages are absent in the metal radio tubes where the insulation of the lead-in wires from the metal base is an expensive operation, and where the metal of the envelope gives off gas which lessens the vacuum and the efficiency of the tube. In other words, my tube of low expansion glass is cheaper to make than the prior metal tubes, is electrically more efficient by maintaining a stable vacuum, and is practically as strong as a metal tube.

The first radio tubes of glass were patterned after the electric light bulbs and were blown of a high expansion glass into swelled shape with very thin walls, which made the tube mechanically weak. The walls of those tubes had to be as thin as possible on account of the relatively high coefficient of expansion of the glass, and so, to give the tube sufficient strength, the glass envelope had to be blown into an expanding shape, which resulted in tubes of considerable size. Now, in my tube of low expansion glass, the walls can be made as thick as necessary for the requisite mechanical strength, and the size and shape of the envelope may be as small as the electrode assembly permits.

In the basic aspect of my invention, my new electron tube of low expansion glass may be constructed for any practical purpose, and may be an amplifier, detector, rectifier, power generator, voltage controller, source of illumination, and so on. As far as I know, I am the first to provide an electric tube with an envelope of a low expansion glass, and I claim that idea in a fundamental way.

It is hardly necessary to add that the drawing is not intended for a shop drawing and does not show the relative dimensions of the parts with mathematical accuracy. On the contrary, I have purposely exaggerated the dimensions of the parts for clearness.

Although I have shown and described certain specific constructions, I would have it understood that my invention is not limited to the details set forth. Various changes and modifications may be made within the scope of the appended claims. Nor is it necessary to use all the features of my invention in the same tube, for some features may be used without others.

I claim as my invention:

1. A cylindrical shield for an electron tube having a cylindrical glass envelope containing electrodes, comprising a cylindrical sheet of metal mounted over said tube and supported thereby, said shield having longitudinal corrugations extending the full length of the shield which render the shield circumferentially resilient to engage the tube with a spring pressure contact for holding the shield firmly in place, each passage formed by the corrugations and the wall of the tube being open at its end to permit circulation of air through the passages.

2. A cylindrical shield for an electron discharge device with a cylindrical glass envelope, comprising a cylinder of sheet metal mounted over and supported by said envelope, said shield having a plurality of longitudinal corrugations bearing against the outer wall of said envelope and extending the length of the shield, each passage formed between adjacent corrugations and the wall of the envelope being open at the ends to permit circulation of air along the passages.

ADOLPH A. THOMAS.